United States Patent Office 3,546,072
Patented Dec. 8, 1970

3,546,072
PREPARATION OF 5-DEHYDRO-SHIKIMIC ACID BY FERMENTATION
Kazumi Araki, Hiroyuki Ueda, and Masahiko Ikumo, Hofu-shi, Japan, assignors to Kyowa Hakko Kogyo Kabushiki Kaisha (Kyowa Hakko Kogyo Company Limited), Tokyo-to, Japan, a body corporate of Japan
No Drawing. Filed May 3, 1968, Ser. No. 726,565
Claims priority, application Japan, June 9, 1967, 42/36,478
Int. Cl. C12d 1/02; C12b 1/00
U.S. Cl. 195—47                    5 Claims

ABSTRACT OF THE DISCLOSURE 5-dehydroshikimic acid is prepared by culturing a 5-dehydroshikimic acid-producing microorganism of the genus Corynebacterium in a culture medium containing a carbon source, a nitrogen source, inorganic material and nutrients. *Corynebacterium glutamicum* ATCC 21,179 is a particularly suitable microorganism for use in the process. 5-dehydroshikimic acid is useful as a precursor of aromatic amino acids and as a medicament.

BACKGROUND OF THE INVENTION 5-dehydroshikimic acid is useful as a starting material for the production of aromatic amino acids and as a medicament, and it is anticipated that its use will increase in the future. This is for the reason that 5-dehydroshikimic acid is utilized by living bodies as a precursor in the biosynthesis of aromatic amino acids contained in proteins and p-amino benzoic acid belonging to the vitamin B group.

Prior investigators have reported that 5-dehydroshikimic acid is formed by the culture of *Escherichia coli* [J. Am. Chem. So., 75, 5567 (1953)] and Neurospora [Biochem. J. 68, 168 (1958)]. It was reported, however, that *E. coli* can accumulate only 100–200 $\gamma$/ml. of the substance.

Accordingly, it is an object of the invention to provide an improved process for producing 5-dehydroshikimic acid whereby there is a greater accumulation of it in the culture broth.

A further object is to provide a process for producing 5-dehydroshikimic acid which is economical in operation and highly suitable for commercial adaptation.

DETAILED DESCRIPTION OF THE INVENTION

We have discovered that a greater accumulation of 5-dehydroshikimic acid can be obtained by culturing a microorganism of the genus Corynebacterium in a culture medium containing a source of carbon, a source of nitrogen, inorganic substances and various other nutrients.

One particularly suitable microorganism for use in the process according to the invention is B–032 strain, a mutant of *Corynebacterium glutamicum* (syn. *Micrococcus glutamicus* disclosed in Japanese Patent Publication No. 8698/1967). A culture of this organism has been deposited without restriction as to its being made available to the public in the American Type Culture Collection in which it is identified as ATCC 21,179. Besides the said strain other similar types of mutant strains belonging to *Corynebacterium glutamicum* have been discovered and can also be used in the practice of the invention, but the amount of the desired product accumulated in the culture broth will not be so great as with B–032 strain.

B–032 strain is obtained by the UV-irradiation of *Corynebacterium glutamicum* (syn. *Micrococcus glutmicus*) MF–121, a glutamic acid-producing strain. The obtained mutant strain can be distinguished from the parent strain with respect to its capability of producing 5-dehydroshikimic acid. The microbiological characteristics of *Corynebacterium glutamicum* used in the present invention were first reported in Bulletin of Agricultural Chemical Society of Japan, vol. 22, 176 (1958) wherein it is identified as *Micrococcus glutamicus*, and recently further study was carried out by Kinoshita et al. from the microbiological and taxonomical viewpoints. They reported in "Amino acids" vol. 2, 42 (1960) and "Recent Progress in Microbiology," vol. 8, 334 (1962) that the microorganism is properly to be classified in Corynebacterium, and they named this microorganism as *Corynebacterium glutamicum*. Whereas, as stated earlier, *E. coli* can accumulate only 100–200 $\gamma$/ml. of 5-dehydroshikimic acid, when said strain of genus Corynebacterium is used according to the present invention, 5-dehydroshikimic acid can be accumulated in the medium in a concentration as high as 5 mg./ml. or even higher. This emphasizes the highly advantageous nature of the present invention.

As the carbon source in the culture medium, glucose is preferably used, but various assimilable carbon sources such as e.g. fructose, mannose, galactose, maltose, sucrose, starch hydrolysate, molasses, glycerol, acetic acid, etc. may be used alone or in admixture.

As the nitrogen source, both organic and inorganic nitrogen compounds, such as ammonia, urea, ammonium sulfate, ammonium chloride, ammonium acetate, ammonium salts of various other organic acids, etc., may be used.

As the inorganic substances which may be included in the culture medium, there may be mentioned various salts of iron, manganese, magnesium, cobalt, zinc, nickel, chromium, etc., as well as various phosphoric acid compounds.

As the nutrients, at least one amino acid (e.g. cystine, cysteine, phenylalanine, tyrosine, tryptophane, glutamic acid, alanine, etc.) and vitamins (e.g. p-aminobenzoic acid, biotin, thiamin, pantothenic acid, etc.) can be added. Yeast extract, Mieki (a soybean meal hydrolysate solution manufactured by Ajinomoto Co., Ltd. and available on the open market in Japan), corn steep liquor, peptone, protein hydrolysate, meat extract, hydrolysate of microbial cells, hydrolysate of fish protein, etc., can also be used as nutrient-containing materials.

5-dehydroshikimic acid fermentation is carried out under aerobic conditions. The culturing temperature is 25–40° C. and preferably 27–37° C. Since the pH of the broth tends to be lowered during the fermentation, it is advantageous to adjust the pH within the range of 5.5–7.2 with a suitable neutralizing agent in order to obtain a high yield. As the neutralizing agent, an alkali, such as ammonia, sodium hydroxide or potassium hydroxide, can be used. It is also possible to use ammonium carbonate, calcium carbonate, calcium hydroxide, urea etc. for this purpose. After culturing for 3–6 days, 5-dehydroshikimic acid is accumulated, but protocatechuic acid may be produced as a by-product under certain culturing conditions.

After culturing, microbial cells are removed from the broth, e.g. by filtration or centrifugation, and the filtrate is treated by a suitable method, e.g. active carbon adsorption, ion exchange resin treatment or organic solvent extraction, singly or in combination, in order to give a 5-dehydroshikimic acid solution. 5-dehydroshikimic acid can be recovered by concentraton under reduced pressure and crystallization, the crystals of the desired product being separated by conventional procedures.

The following examples serve to illustrate the invention, but are not to be considered as limiting the same:

EXAMPLE 1

A culture medium was inoculated with *Corynebacterium glutamicum* (syn. *Micrococcus glutamicus*) B–032, the culture medium containing peptone (1 g./dl.), meat extract (1 g./dl.), yeast extract (0.5 g./dl.), sodium chloride (0.3 g./dl.) and glucose (2 g./dl.) and having a pH of 7.0. Culturing was continued for 24 hours to obtain a seed culture.

Fermentation was carried out using a culture medium containing glucose (10 g./dl.), ammonium chloride (0.5 g./dl.), ammonium sulfate (1.5 g./dl.), $KH_2PO_4$ (0.15 g./dl.), $K_2HPO_4$ (0.05 g./dl.), $MgSO_4 \cdot 7H_2O$ (0.05 g./dl.), $FeSO_4 \cdot 7H_2O$ (0.002 g./dl.), $MnSO_4 \cdot 4H_2O$ (0.002 g./dl.), phenylalanine (200 γ/ml.), biotin (30 γ/l. and $CaCO_3$ (2 g./dl.). 20 ml. portions of the prepared medium were placed into separate 500 ml. Sakaguchi flasks and each was sterilized. The sterile culture medium in each of the flasks was inoculated with 1 ml. of the seed culture, the preparation of which was described above. Fermentation was carried out at 28° C. for 4 days with shaking. An average of 4.13 mg./ml. of 5-dehydroshikimic acid was accumulated in the culture medium in each flask. The broths were combined (1 l. in total) and filtered to remove microbial cells. The filtrate was adjusted with HCl to a pH of 3.0, 500 g. of active carbon were added, and stirred so as to adsorb 5-dehydroshikimic acid. The adsorbed 5-dehydroshikimic acid was eluted with 98% ethanol and the eluate was concentrated under reduced pressure at about 45° C. The concentrated syrup was dissolved in 100 ml. of 98% ethanol and the precipitate which formed was removed by filtration. After the ethanol was evaporated, the resulting residue was dissolved in 200 ml. of water and was filtered. The filtrate was concentrated under reduced pressure, a small amount of 98% ethanol was added and the resulting solution was allowed to cool on standing to give 1.83 g. of crude crystals of 5-dehydroshikimic acid. The melting point of the recrystallized product was found to be 150–151.5° C. The UV-adsorption spectrum and Rf value on paper chromatography were identical with those given in prior reports. Reduction of ammoniacal silver nitrate and of Fehling reagent and formation of a 2,4-dinitrophenyl hydrazone were also observed. Formation of protocatechuic acid was confirmed by dissolving in conc. HCl at a concentration of 1 g./dl. and heating at 100° C.

EXAMPLE 2

Repetitive fermentations were carried out in a similar manner to that described in Example 1, except that a basal medium containing glucose (10 g./dl.), ammonium sulfate (1.5 g./dl.), ammonium chloride (0.5 g./dl.), $KH_2PO_4$ (0.15 g./dl.), $K_2HPO_4$ (0.05 g./dl.), $MgSO_4 \cdot 7H_2O$ (0.05 g./dl.), $FeSO_4 \cdot 7H_2O$ (0.002 g./dl.), $MNSO_4 \cdot 4H_2O$ (0.002 g./dl.), biotin 30 γ/l. and $CaCO_3$ (2 g./dl.) was used and in each experiment there was added one member of the group of yeast extract, meat extract, NZ-amine, Mieki and peptone. The results obtained are shown in the following table:

TABLE

| Additive | Added amount (g./dl.) | Amount of 5-dehydroshikimic acid (mg./ml.) | Amount of protocatechuic acid produced as by-product (mg./ml.) |
|---|---|---|---|
| Yeast extract | 1.0 | 5.82 | |
| Meat extract | 2.0 | 4.83 | |
| NZ-amine [1] | 0.25 | 2.31 | 1.30 |
| Mieki [2] | 1.5 | 4.92 | |
| Peptone | 0.25 | 5.12 | |
| None | | 1.8 | Trace 0.5 |

[1] NZ-amine is the trade name of a commercial casein hydrolysate.
[2] Mieki is the trade name of a commercial product which is the residual solution of a gluten or soybean meal hydrolysate from which glutamic acid has been estracted.

We claim:
1. A process of preparing 5-dehydroshikimic acid, comprising aerobically culturing Corynebacterium glutamicum ATCC 21,179 in a culture medium containing a carbon source, a nitrogen source, inorganic material and nutrients and recovering the accumulated 5-dehydroshikimic acid from said culture medium.

2. A process as claimed in claim 1 in which the temperature of said culture medium is maintained within the range of 25–40° C.

3. A process as claimed in claim 2 in which said temperature is within the range of 27–37° C.

4. A process as claimed in claim 1 in which the pH of said culture medium is maintained within the range of 5.5–7.2.

5. A process as claimed in claim 1 in which culturing is continued for a period within the range of 3–6 days.

References Cited

Metzenberg et al., Biochemical J., vol. 68, No. 1, pp. 168–72, 1958.

Salamon et al., J. Am. Chem. Soc., vol. 75, No. 22, pp. 5567–71, 1954.

A. LOUIS MONACELL, Primary Examiner

G. M. NATH, Assistant Examiner

U.S. Cl. X.R.

195—30